United States Patent
Koerner et al.

(10) Patent No.: US 12,155,936 B2
(45) Date of Patent: Nov. 26, 2024

(54) METHOD FOR SIMULATING AN OPTICAL IMAGE REPRESENTATION

(71) Applicant: Carl Zeiss AG, Oberkochen (DE)

(72) Inventors: Martin Koerner, Jena (DE); Alexander Schroer, Aalen (DE); Christopher Weth, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 17/592,342

(22) Filed: Feb. 3, 2022

(65) Prior Publication Data
US 2022/0247906 A1 Aug. 4, 2022

(30) Foreign Application Priority Data
Feb. 3, 2021 (DE) ...................... 10 2021 200 965.4

(51) Int. Cl.
*H04N 23/71* (2023.01)
*G06T 3/4007* (2024.01)
(Continued)

(52) U.S. Cl.
CPC ........... *H04N 23/71* (2023.01); *G06T 3/4007* (2013.01); *G06T 5/50* (2013.01); *H04N 23/67* (2023.01); *G06T 2207/20221* (2013.01)

(58) Field of Classification Search
CPC ........ H04N 23/71; H04N 23/67; H04N 23/54; H04N 23/55; H04N 23/75; G06T 3/4007;
(Continued)

(56) References Cited

U.S. PATENT DOCUMENTS

| | | | |
|---|---|---|---|
| 1,786,916 A | 12/1930 | Merte | |
| 4,965,840 A * | 10/1990 | Subbarao | G01C 3/085 |
| | | | 396/307 |

(Continued)

FOREIGN PATENT DOCUMENTS

| | | |
|---|---|---|
| DE | 263604 A1 | 1/1989 |
| DE | 102018118187 A1 | 1/2020 |

(Continued)

OTHER PUBLICATIONS

Schrade et al. in Brute-force calculation of aperture diffraction in camera lenses—Technical Report (Dec. 20, 2019), Germany, (https://cg.ivd.kit.edu/publications/2019/lens_diffraction/paper.pdf).
(Continued)

*Primary Examiner* — Padma Haliyur
(74) *Attorney, Agent, or Firm* — Ewers IP Law PLLC; Falk Ewers

(57) ABSTRACT

A method for generating a brightness contribution for a picture element of an image includes providing a first data record including data which describe the effect on light rays of the lens, providing a second data record including data about a point of incidence of a light ray on the image recorder and about a virtual front surface, providing a transformation rule, calculating a first point of intersection of the light ray with the virtual front plane and a direction of the light ray at the first point of intersection by applying the transformation rule to the first and second data records, determining the brightness contribution of the light ray, storing an information item regarding the calculated brightness contribution. The first data record includes data about a second surface and the second data record includes data about a second point of intersection of the light beam with the second surface.

17 Claims, 10 Drawing Sheets

(51) Int. Cl.
*G06T 5/50* (2006.01)
*H04N 23/67* (2023.01)

(58) Field of Classification Search
CPC . G06T 5/50; G06T 2207/20221; G06T 15/06; G06T 15/50; G06T 15/02; G02B 27/0012; G03B 9/02; G03B 17/12
See application file for complete search history.

(56) References Cited

U.S. PATENT DOCUMENTS

| | | | | |
|---|---|---|---|---|
| 5,193,124 A | * | 3/1993 | Subbarao | G01C 11/02 382/280 |
| 6,028,606 A | | 2/2000 | Kolb et al. | |
| 10,306,146 B2 | * | 5/2019 | Hayasaka | H04N 23/71 |
| 10,453,183 B2 | * | 10/2019 | Hayasaka | H04N 23/73 |
| 2021/0150804 A1 | | 5/2021 | Wick et al. | |

FOREIGN PATENT DOCUMENTS

| | | |
|---|---|---|
| JP | 2009230699 A | 10/2009 |
| WO | 2020021121 A1 | 1/2020 |

OTHER PUBLICATIONS

Office Action issued in German Patent Application No. DE 10 2021 200 965.4, dated Dec. 13, 2021 (from which this application claims priority) and English language translation thereof.
Zheng et al. in Adaptive sparse polynomial regression for camera lens simulation—In: The Visual Computer, vol. 33, Issue 6, China, Jun. 2017.
Office Action issued in Australian Patent Application No. AU2022200296, dated Dec. 13, 2022 and English language translation thereof.
Hanika et al., "Efficient Monte Carlo rendering with realistic lenses", Computer Graphics Forum : Journal of the European Association for Computer Graphics, vol. 33, No. 2, 2014.
Haeberli et al., "The accumulation buffer: hardware support for high-quality rendering", Proceedings of the 3rd International Conference on Industrial and Engineering Applications of Artificial Intelligence and Expert Systems—vol. 2, ACMPUB27, New York, NY, USA, Aug. 1990.
Xuan et al., "Real-time Depth of Field Rendering via Dynamic Light Field Generation and Filtering", Computer Graphics Forum : Journal of the European Association for Computer Graphics, Wiley-Blackwell, Oxford, vol. 29, No. 7, 2010.
European Search Report dated Jun. 21, 2022 in European counterpart application No. EP 22 15 4149.
Schrade et al. in E. Schrade, J. Hanika, C. Dachsbacher, Sparse high-degree polynomials for wide-angle lenses, Eurographics Symposium on Rendering 2016, vol. 35, No. 4. in English.
Office Action dated Feb. 14, 2023, issued in Japanese counterpart application No. 2022-014035 and English-language Office Action Summary thereof.
Office Action dated Aug. 14, 2023, issued in Canadian counterpart application No. 3,148,635 in English and Office Action Summary thereof.
Office Action dated Jul. 21, 2023 issued in New Zealand counterpart application No. 784361.
Office Action dated May 23, 2024, issued in Canadian counterpart application No. 3,148,635 in English.
Office Action dated May 8, 2024, issued in European counterpart application No. 22 154 149.3 and English-language translation thereof.
Office Action dated Sep. 7, 2023, issued in New Zealand counterpart application No. 784361 in English.

* cited by examiner

Purely random positions

Positions similar to a Fibonacci spiral

METHOD FOR SIMULATING AN OPTICAL IMAGE REPRESENTATION

CROSS REFERENCE TO RELATED APPLICATIONS

This application claims priority to German patent application DE 10 2021 200 965.4, filed Feb. 3, 2021, the entire content of which is incorporated herein by reference.

TECHNICAL FIELD

The disclosure relates to a method for generating a brightness contribution, a method for generating a picture element, a method for generating an image, a method for generating an image sequence, and a computer program product.

BACKGROUND

Image recording systems containing a camera module and a lens are used for the photographic recording of images, in particular also for the recording of image sequences. The camera module contains an image recorder, which can be an electronic image recording sensor or a light-sensitive chemical film. The lens usually contains a plurality of optical elements, such as optical lens elements, stops and/or mirrors. Such lenses frequently contain a stop that can change in size, the so-called aperture stop. The optical image representation comes about by virtue of light from the object to be imaged falling through these elements and onto the image recording sensor or the film material. Such an optical image representation is usually afflicted by optical imaging aberrations, for example defocus, coma, spherical aberration, geometric distortion or radial brightness drops as a result of what is known as vignetting. These so-called geometric imaging aberrations frequently depend on the focus setting, on the set aperture stop of the lens and/or on other parameters, for example the focal length of the lens. In their totality, the imaging aberrations for every given lens cause a characteristic geometric imaging behavior on account of its specific optical lens design. The effect is particularly conspicuous in the image representation of object features which are out of focus since such object features have a blurred reproduction, to be precise with ever greater blurring the further away such an object feature is from the ideally focused area, and with ever greater blurring the larger the aperture stop of the lens has been set.

The characteristic with which such defocused object points are imaged is usually referred to as bokeh. By way of example, lenses are known, in which defocused object points which are located significantly away from the optical axis are imaged onto stretched, slightly curved out-of-focus regions. By way of example, this may apply to what are known as Biotar-type lenses, as is described in U.S. Pat. No. 1,786,916, for example.

By way of example, reflective lens-type lenses, one of which is described in DD 263604 A1 in exemplary fashion, have a completely different characteristic. Such lenses usually image defocused object points onto ring-shaped out-of-focus regions. In the case of image representations using such lenses, the bokeh frequently exhibits a pronouncedly unsteady ring pattern, especially in the case of objects with pronounced highlights.

Moving photographic recordings are frequently mixed with virtual images and/or virtual image sequences during the production of motion pictures or the like. This method is frequently referred to as rendering. The result of such rendering is a digitally generated image or a digitally generated image sequence. Such an image or such an image sequence is generated by calculation from a mathematical model of the scene to be presented. Such a model of the scene contains, inter alia, information items about properties, for example shape, color, and optical surface properties, of the objects to be modeled in the scene to be modeled. A mathematical model of the illumination, consisting inter alia of the location, the type, the color, and the direction of the individual light sources to be modeled, is applied to this model of the scene. For the actual calculation of the image, at least the position in the scene, the recording direction, and the field of view of the virtual camera are required. The generation by calculation of the image or the image sequence of the modeled scene using the virtual camera and partial steps of the generation by calculation are referred to as simulation here. A simple pinhole camera principle (camera obscura), which is based on a simple geometric projection according to the mathematical principle of the intercept theorem, is often used for this calculation. Although very simple, this forms the basis of a simulation of an ideal-typical photographic image representation since no geometric image aberrations occur in this case.

The process of mixing rendered sequences of virtual images with real recorded image sequences represents a usual procedure in the field of real-time 3D computer graphics and in the field of visual effects in cinematography. The effects generated in this way are referred to as VFX (from 'visual effects'). Mixing real images with virtual images is also known as augmentation. Augmentation frequently is part of what is known as compositing, a step in the post processing or post-production of a cinematographic film, where images from different sources are brought together. Particularly when mixing images or image sequences of real scenes obtained by photography with virtually generated content, it is desirable that this virtually generated content in a final image or image sequence has no differences or differences that are hardly recognizable from images or image sequences of real scenes obtained by photography and hence imparts an impression that is as photo-realistic as possible. This is achieved by virtue of the digitally generated content being generated with boundary conditions that are as close as possible to the boundary conditions of real image recordings. A correct simulation of the real imaging chain contains, firstly, the boundary conditions for mathematical description of the scene and the illumination, but secondly also the boundary conditions relating to the recording, that is to say, in particular, of the optical image representation on the image recorder or sensor. These are not reproduced by a simple geometric camera model, that is to say a simulation of a pinhole camera.

A further important application for rendered images or rendered image sequences are completely animated images or image sequences, that is to say those where the entire information content originates from a virtual scene and no mixing with a real image, or a real image sequence is undertaken. This contains the field of animated motion picture production and the field of virtual reality, which is used for example in the field of computer games, but also for example in the field of training simulators, for example flight simulators for training pilots or train simulators for training locomotive engineers. Specifically in the field of animated motion pictures and computer games, it is desirable to generate a certain, photo-realistic impression of the scene. Further, this method can be used, for example in the field of medical imaging, for mixing real medical image recordings with computer-generated image representations.

Rendered images are usually generated using techniques such as ray tracing. In the case of ray tracing, the optical ray paths are calculated from the light sources to the object and from the object to the image recorder. In practice, this calculation step is frequently carried out in such a way that the rays are traced backwards from the image recorder to the object, that is to say in the opposite direction to the propagation of the physical rays in the optical device itself. Naturally, tracing along the light direction is equivalent and likewise possible.

Frequently, the aforementioned simple pinhole camera model is used in such ray tracing calculations for the simulation of the optical image representation on the image recorder. Here, one of the advantages consists of the fact that so-called ideal images arise, which contain no geometric imaging aberrations. In this model, all rays of the ray tracing calculation are calculated through a point disposed upstream of the simulated image recorder in the simulation, the distance of said point from the image recorder being chosen to be just so large that the geometrically calculated field of view corresponds to the field of view of the camera system to be simulated. This point of the simulation corresponds to the center of a very small hole in a real pinhole camera. The advantage of simulating a pinhole camera lies not only in the simplicity of the mathematical model but also in the high speed with which such calculations can be carried out. In particular, special graphics processors or graphical processing units (GPUs) can carry out such imaging simulations particularly quickly and in parallel for many picture elements. This parallelization brings about a great gain in speed, up to the calculation of entire complex virtual scenes in real time.

However, as a matter of principle, the above-described image aberrations or image characteristics that occur in the case of a real recording using a real camera with a real lens are not taken into account and the arising image impression of the simulation often remains far apart from the impression that would arise when observing comparable real images. This may be problematic, in particular, if rendered image content and real recorded images or image sequences are intended to be mixed. To compensate for this, means of two-dimensional image processing and artistic means are frequently used. By way of example, blurriness is subsequently introduced by calculation into the ideal image or images obtained by the simulation of a pinhole camera, the blurriness being intended to be as similar as possible to the blurriness generated by the real camera. The correction or the introduction of geometric distortions and a brightness drop in the form of vignetting are further effects that can simply be added by calculation. As a rule, such corrections are phenomenologically adjusted such that the image impression of the images obtained by simulation comes as close as possible to that of images obtained by real recordings.

It is therefore desirable to reproduce the properties of a real recording lens, which is used to record real images, with as many of its properties as possible in the simulation. Firstly, to obtain a correspondence of the characteristics such as bokeh which is as exact as possible and secondly to be able to work with a straightforward process which does not require empirical trialing of parameters or even artistic skill but instead is deterministically comprehensible and hence predictable. Naturally, it is possible as a matter of principle to apply the ray tracing technique to the entire optical part of the image recording system as well. Indeed, such ray tracing has already found broad application in the design and optimization of optical systems for many years. However, the use in the field of VFX or 3D computer graphics is unusual since these techniques contain very many computational operations, and are therefore very resource and time intensive, and hence expensive. The aforementioned GPUs usually used for rendering are not designed for such complex imaging simulations.

During a ray tracing simulation, the substantial computational outlay for a realistic model of a lens to be simulated arises by virtue of a plurality of ray deflections in the interior of the lens to be simulated having to be calculated according to the law of refraction from geometric optics. Such deflections occur at each interface between optical material and air and also at each interface between different optical materials, for example in the case of so-called cemented elements. Such ray tracing must be carried out multiple times for each picture element with different angles of incidence on the image recorder so that the transmissive region of the aperture stop of the lens to be simulated is rastered well. In the process, approximately 1000 or more rays to be calculated may be needed for each picture element in order to generate high-quality images. Moreover, within the scope of ray tracing, such calculations must usually be carried out for different wavelengths of the light since the optical materials have wavelength-dependent refractive indices, and hence wavelength-dependent ray deviations, on account of dispersion properties. Additionally, there is ray absorption within the lens, so-called shading, for example at the aperture stop but also at lens element mounts, for example. This ray absorption must likewise be captured by the simulation since it contributes significantly to bokeh and vignetting of the lens.

Ray tracing needs to be carried out multiple times for each pixel of the image sensor, in such a way that the light rays incident on each sensor pixel penetrate the exit pupil of the lens to be simulated as a sufficiently dense beam. This is the only procedure to allow a realistic simulation of the imaging properties of a lens to be simulated which are caused by geometric effects.

In addition to the high computational outlay, a disadvantage of the ray tracing simulation of the lens, especially in the VFX field, is that this requires accurate knowledge of the optical setup of the lens to be simulated. By way of example, this includes variables such as lens element materials, lens element radii, radii of curvature, asphere parameters and/or distances between optical elements of the lens, especially if these distances are variable. This means that an operator or user of the ray tracing method requires knowledge of all these parameters. Conversely, a simulation of the imaging property of a lens by ray tracing is impossible without knowledge of these parameters. So as not to have to share details about the structure of the lens to be simulated, it is desirable to have an option of allowing third parties to carry out realistic simulations of the imaging property of a lens to be simulated without to this end requiring details about the structure at all.

A known method for reducing the computational outlay is the method described by Schrade et al. in E. Schrade, J. Hanika, C. Dachsbacher, Sparse high-degree polynomials for wide-angle lenses, Eurographics Symposium on Rendering 2016, Vol. 35, No. 4. Here, use is made of an abstract lens model in which the coefficients of a plurality of polynomials of a transformation rule are chosen such that, when the location and the direction of a ray incident on the lens to be simulated are input, the location and the direction of the corresponding ray emerging from the lens to be simulated are output. Such a lens model or simulated lens is abstract inasmuch as it contains no information about the physical structure of the modeled lens or lens to be simulated, which is why the structure thereof cannot be deduced or obtained by back calculation from the coefficients of the model. All that is required is the rule of how rays are deflected during their propagation through the lens. In this way, Schrade et al. describe an abstracted simulation of the imaging property of a lens in an optical imaging system.

The simulation of the image representation by the simulated lens is carried out by the application of the transformation rule with suitable coefficients to the simulated location and the simulated direction of a simulated light ray emerging in the direction of the image recorder. The results of the simulation are the simulated location and the simulated direction of a simulated light ray incident from the object. The simulation method can also be applied without restrictions to ray tracing in the reverse direction and can supply as results the location and the direction of a simulated emerging light ray. Naturally, an appropriately inverted transformation rule should be used in this case.

The simulation method by Schrade et al. assumes a fixed focus position and a fixed focal length of the simulated lens. If one of these parameters is altered, it is necessary to recalculate the entire abstract lens model, which is represented by the coefficients of the utilized transformation rule. This procedure is very computationally intensive and therefore time consuming.

A further assumption made in the simulation method by Schrade et al. is that the ray incident on the lens strikes the first lens surface and the effect of the lens on the ray starts there. As a result, the simulation method described therein discloses to the user of the method information about the simulated lens, specifically the shape of the front surface of the simulated lens. Consequently, this is not a complete abstraction of the lens.

In respect of the focus setting of the simulated lens, the method by Schrade et al. uses the displacement of the plane of the simulated image recorder relative to the simulated lens. This type of focus setting is only realized in the case of simple lenses, for example the aforementioned Biotar lens. In modern lenses, the focus is often adjusted by displacing one or more lens elements relative to other optical elements of the lens. In this case, the lens elements may be combined as lens-element groups which are displaced as an entire unit. A solution for the fast simulation of such complex lenses cannot be gathered from the teaching by Schrade et al.

A lens with the variable focal length, which is also referred to as pancratic lens, varifocal lens or zoom lens, also makes use of optical lens elements and groups of optical lens elements, which are displaceable relative to the others, in order to bring about the change in the focal length. Should the teaching by Schrade et al. be used to simulate such zoom lenses, a separate transformation rule with suitable coefficients must be provided for each individual simulated, displaceable assembly. Moreover, the displacement of the assemblies must be disclosed. Consequently, there is not a complete abstraction of the effect of the simulated lens for zoom lenses. Moreover, a simulation following the teaching by Schrade et al. allows conclusions to be drawn about the installation size of the aperture stop and its penetration by rays depending on the position and direction in the image space, from which sensitive properties of the lens can be derived. Furthermore, how to deal with rays being shaded, that is to say being absorbed and therefore not contributing to the image generation, at different positions in a lens, for example at stops or mounting parts, is not shown.

SUMMARY

It is therefore an object of the disclosure to further develop the simulation method taught in the prior art such that the set of coefficients describing the lens is completely abstracted from the structure of the lens and therefore allows no conclusions to be drawn about the structure of the simulated lens. It is also an object of the disclosure to further develop the simulation method taught in the prior art such that it requires no computationally intensive recalculations for the coefficients of the transformation rule if the focus, the focal length or one or more continuous parameters of the simulated lens are changed.

The first object is achieved by a method for generating a brightness contribution for a picture element of an image as described herein. The second object is achieved by a method for generating a brightness contribution for a picture element of an image by simulating an image representation of a scene using an optical imaging system which includes a lens which has at least one adjustable imaging parameter and a data record which contains information items about the at least one adjustable imaging parameter of the lens.

BRIEF DESCRIPTION OF THE DRAWINGS

The disclosure will now be described with reference to the drawings wherein.

DESCRIPTION OF EXEMPLARY EMBODIMENTS

Figure 1:
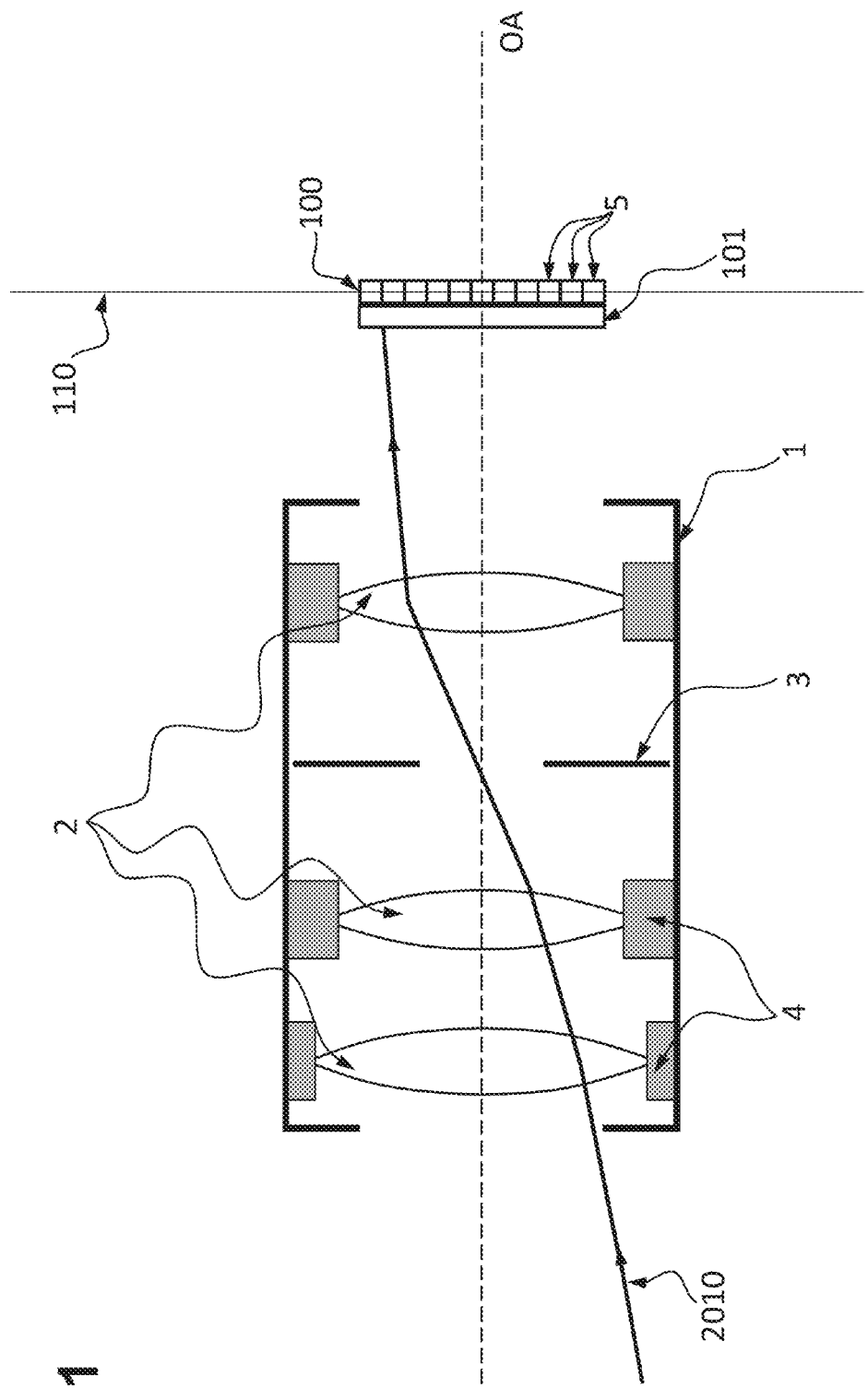
FIG. 1 schematically shows the principle of image recording.

The image recording principle is shown schematically in FIG. 1. A given lens 1, to be simulated, for photographic image recording includes lens elements 2 and frequently a size-adjustable aperture stop 3. Each lens has a certain radius and is held by a non-transparent mount 4. The image recorder 100, which is also referred to as sensor below, is attached at a position that depends on the specific design of the optics of the lens 1 to be simulated. The sensor 100 to be simulated may include a plurality of light detectors, the so-called pixels 5, which are usually arranged in the form of a grid. Each of these pixels records a picture element during the recording. The image arises optically at the location of the sensor 100 and it is there in a real camera system that there is an electronic or chemical detection of the respective incident luminous intensity at each pixel or picture elements: the recording of a picture element. The sensor may be equipped with a grid-shaped color filter 101, for example arranged in a so-called Bayer pattern, such that each pixel 5 can only detect a certain color. Another possibility is that each pixel 5 can for example detect all three primary colors, for example red, green, and blue. In the simulation, this corresponds to the registration and storage in the processed computer system of at least the calculated intensity and if also required the color of the simulated incident light ray. Storage is typically implemented in the so-called random-access memory, the RAM, but may also be implemented for example in what is known as a flash memory or on a magnetic disk. Light rays which emanate from a point in a scene to be imaged and potentially contribute to the image representation pass through the lens and are refracted at the interfaces of the lens elements in the process, that is to say their direction is altered in each case in accordance with the optical law of refraction. One portion of these light rays is incident on parts of the mount 4 of the lens 1 and is absorbed and does not contribute to the image representation. The absorption of rays at parts of the lens is referred to as shading and brings about what is known as vignetting. Another portion of the light rays may be incident on the aperture stop 3, is absorbed there and does not contribute to the image representation. A further portion of the light rays passes through the lens and strikes the image recorder 100. These light rays contribute to the image representation.

The lens 1 to be simulated may include one or more parameters that are adjustable on the lens 1. Inter alia, these may be one or more of the following:

An aperture stop: at least one approximately circular stop is mounted in lenses, the optically transmissive diameter of said stop may be altered by the user. Often this is made of what are known as iris diaphragms.

For setting the focus, a lens may be equipped with one or more lens elements which are displaceable along the optical axis relative to the image detection plane and typically also displaceable relative to other optical elements.

For variably adjusting the focal length, a lens may be equipped with one or more lens elements which are displaceable along the optical axis relative to the image detection plane and typically also displaceable relative to other optical elements. Instead of the focal length, the magnification of the lens may also be used as a continuous input variable. The magnification is a scaling factor which arises from the ratio of the size of an image of an object on the sensor or film plane and the size of this imaged, focused object. It was found that the choice of magnification as input variable is particularly well suited to the method according to an exemplary embodiment of the disclosure.

For variably adjusting the field curvature, a lens may be equipped with one or more lens elements which are displaceable along the optical axis relative to the image detection plane and typically also displaceable relative to other optical elements.

For the variable manipulation of a wavefront of the light passing through the lens, the lens may be equipped with displaceable free-form elements. By way of example, these can be one or two so-called Alvarez elements which are displaceable perpendicular to the optical axis.

Such parameters that are adjustable on the lens 1 to be simulated correspond to typically continuously adjustable input variables in a lens simulation. The known teaching regarding the simulation of the optical imaging by lenses from Schrade et al. serves as a start point for the method according to an exemplary embodiment of the disclosure. In this known teaching, the continuously adjustable input variables are defined before the calculation of the coefficients that model the lens and determine the values of the latter. Should these values be altered, the coefficients modeling the lens need to be recalculated in this simulation method.

Figure 2:
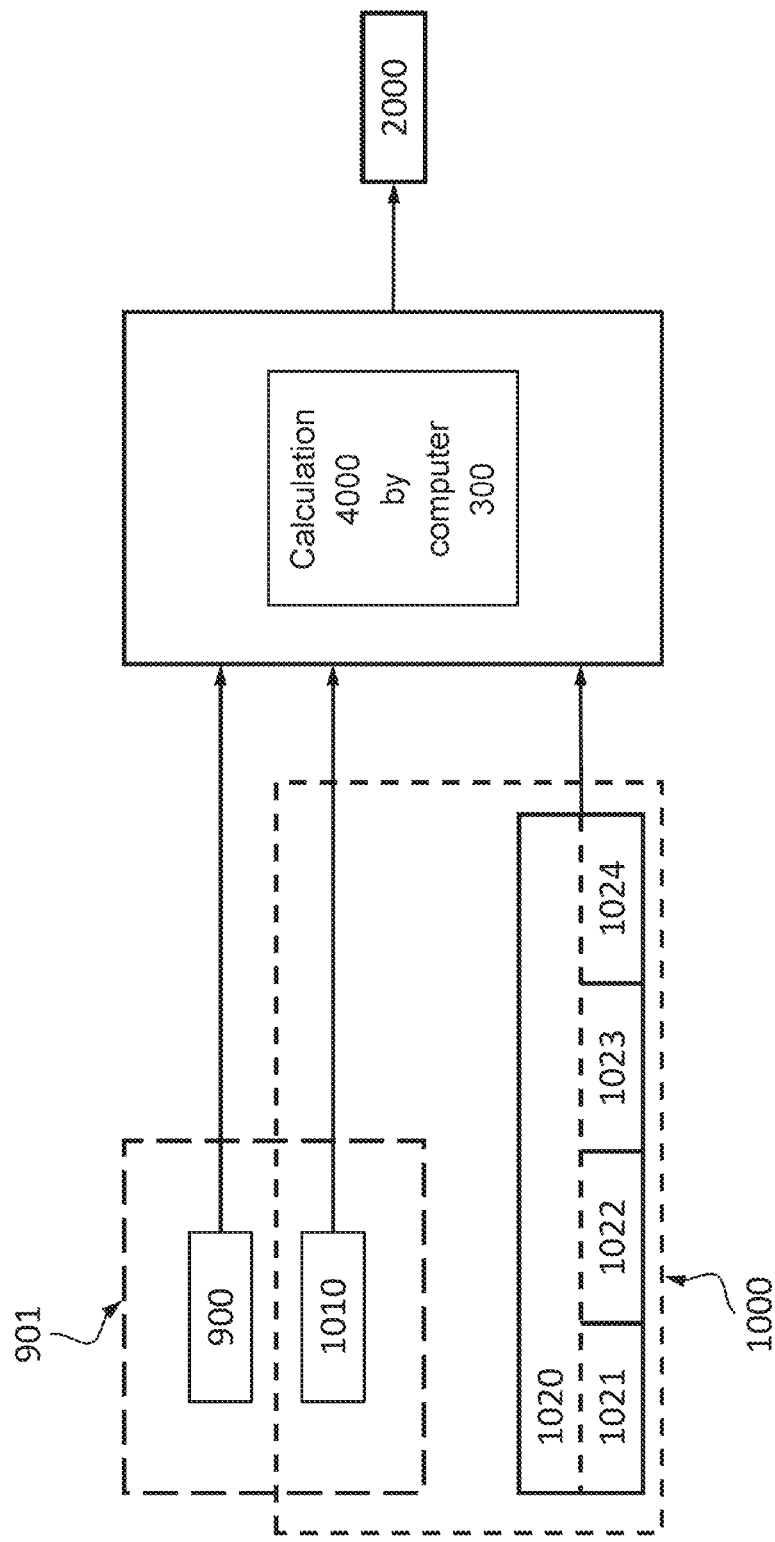
FIG. 2 schematically shows the principle of the simulation according to an exemplary embodiment of the disclosure.
Figure 3:
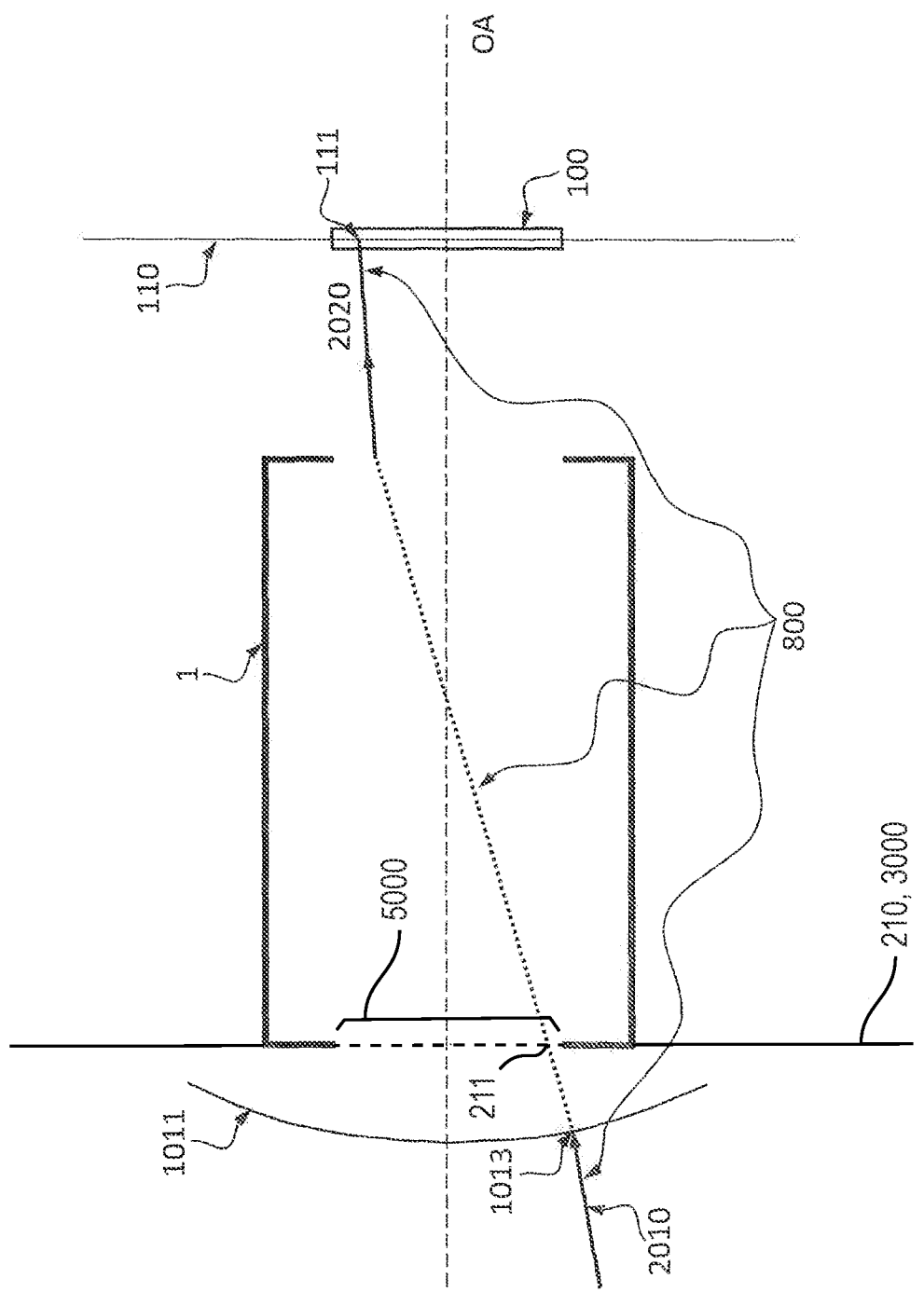
FIG. 3 schematically shows the effect of the optical imaging of a lens.

The simulation according to an exemplary embodiment of the disclosure of the optical imaging of a lens to be simulated is a based on a transformation rule 900. This is shown schematically in FIG. 2. In a calculation 4000 carried out by a computer 300, this transformation rule 900 processes data from one or more input data records 1000 and converts these into an output data record 2000. The transformation rule 900 may include, inter alia, a polynomial. The transformation rule 900 may include, inter alia, a spline function. The effect of the optical imaging shown in FIG. 3 is expressed in that a simulated ray 800, which is emitted by the simulated object and which intersects a surface, differing from the simulated sensor 100, at a certain position and with a certain direction as incident ray 2010, following the passage through the lens is incident on a point of the simulated sensor 100 as emergent ray 2020 in a certain direction, this direction generally deviating from the original ray direction. The resultant beam offset and the resultant change in direction of the traversing light ray 800 is the effect of the lens 1. The rays referred to as incident ray 2010 and emergent ray 2020 are partial rays of the ray 800 passing through the lens. Some of the information required for the complete description of the light ray 800 may also be information regarding polarization, one or more wavelengths or colors, in each case connected with an intensity.

The effects on a traversing ray 800 caused by the lens 1 may include a ray offset, a change in direction, a change in polarization, a change in color, an attenuation of the ray intensity, a split of the ray into partial rays or other changes. A plurality of these effects may also occur simultaneously in relation to one ray 800. By way of example, a split into partial rays may be caused by a partial transmission and reflection at optically refractive surfaces or at coating surfaces, by a split into ordinary and extraordinary rays in optically anisotropic crystals, or by diffraction at diffractive structures or holograms. All these effects are effects of a lens 1 that are detected according to the disclosure.

For practical reasons, optical simulations are often carried out in such a way that the rays are traced in the opposite direction, that is to say starting from the sensor. This description of the disclosure follows this approach but explicit reference is once again made to the fact that, according to an exemplary embodiment of the disclosure, a ray simulation in the light direction is captured by the exemplary embodiment of the disclosure.

According to an exemplary embodiment of the disclosure, the simulated sensor 100 is located on a first surface, the sensor surface 110. Light rays 800 to be simulated are incident on this surface at a point of incidence 111.

Figure 4:
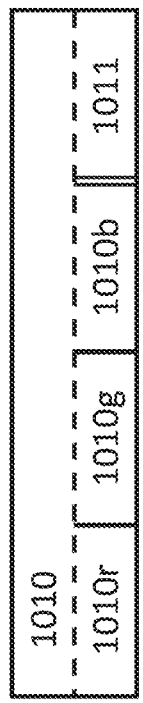
FIG. 4 schematically shows the construction of the first data record.

According to an exemplary embodiment of the disclosure, a first data record 1010, the input data record, contains, inter alia, data suitable, in conjunction with the transformation rule 900, for describing the effect of the simulated lens on simulated light rays 800 that pass through the simulated lens. In this case, the characteristics of the simulated lens are contained only in the first data record 1010 and not in the transformation rule 900. By contrast, neither the first data record 1010 of the transformation rule 900 contain data about light rays to be simulated or parameters that are adjustable on the simulated lens. Together, the transformation 900 and the first data record 1010 may be referred to as a virtual lens 901 since the sharing of only these information items is sufficient for the user to be able to create renderings of virtual scenes with their own data. As shown schematically in FIG. 4, the first data record 1010 may contain one or more partial data records 1010r, 1010g, and 1010b, which are each assigned to a certain wavelength of the light, or to a certain wavelength band. This takes account of chromatic imaging aberrations, which occur in real lenses for physical reasons. Typically, three such partial data records 1010r, 1010g, and 1010b are kept available, specifically for red, green, and blue. However, use can also be made of more or fewer such partial data records. According to an exemplary embodiment of the disclosure, color effects may also be calculated by a differential approach from only one of the first data record 1010, especially if the chromatic aberrations are small.

According to an exemplary embodiment of the disclosure, the first data record 1010 furthermore contains data which include information about a first surface or virtual entrance surface or virtual front surface 1011, which is intersected by simulated rays of the imaging beam path or the continuation thereof at a first point of intersection 1013. This surface is typically disposed upstream or downstream of the simulated sensor. Typically, this first surface or virtual front surface 1011 is a rotationally symmetric surface, the axis of symmetry of which corresponds to the optical axis OA of the simulated lens, and which is typically disposed upstream of the actual surfaces of the lens to be simulated. In particular, but without this list being exhaustive, it includes spherical surfaces and other surfaces formed by rotating conic sections, and planes. The first surface of virtual front surface 1011 may coincide with a lens-element surface of the simulated lens, but this need not be the case. Typically, the virtual front surface 1011 precisely does not coincide with a lens-element surface of the simulated lens. Another typical position for the virtual front surface is the entrance pupil of the lens. Particularly typically, the virtual front surface 1011 is placed such that it is further away from the sensor 100 than the lens-element surface which is furthest away from the sensor. Typically, the virtual front surface is chosen such that its position and shape remain constant when there is a change in the focal length, the focus or other adjustable lens parameters. This reduces the complexity of the simulation and increases the confidentiality since the virtual front surface 1011 thus contains no information whatsoever about the real construction of the lens to be simulated.

The data record may include a polynomial. Depending on the desired fitting precision of the ray position or the ray direction and the information regarding shading surfaces that generate vignetting, the polynomial may include at least 5, or at least 10, or at least 20, or at least 30 coefficients. By way of example, a sparse polynomial with 20 coefficients of no more than 6th order for ray position and ray direction, and with 5 coefficients of no more than 3rd order for shading information may be used.

Figure 5:
FIG. 5 schematically shows the construction of the second data record.
Figure 6:
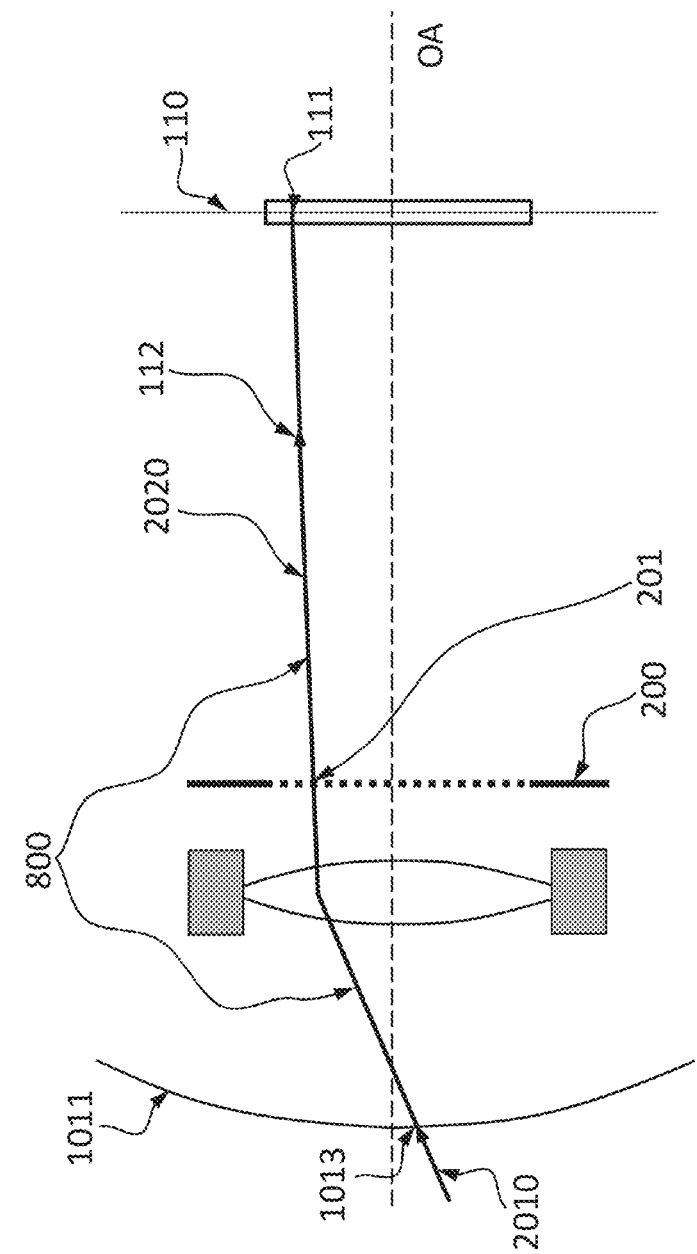
FIG. 6 schematically shows the principle of a ray tracing simulation.

A second data record 1020, schematically shown in FIG. 5, contains, inter alia, information items 1021 about a simulated light ray 800, including information about a point of incidence 111 of this simulated light ray 800 on the sensor surface 110 and a directional information item 112 for this ray. The information about the point of incidence 111 may be provided by a three-dimensional vector in a coordinate system linked to the simulated lens, or else by two-dimensional parameters which describe the position on the sensor surface 110 in parameterized fashion, as is shown in FIG. 6. By way of example, without this list being exhaustive, this may be an azimuth angle and a radius or a normalized radius or an elevation angle. The directional information item 112 of the simulated ray may be given, in exemplary fashion and without this list necessarily being exhaustive, by the specification of a three-dimensional vector or else by the specification of two angles in relation to a coordinate system linked to the simulated lens. A further particularly typical representation of the direction according to an exemplary embodiment of the disclosure may also include the parameterized specification of a second point of incidence 201 with a second surface 200, shown in FIG. 6, which in conjunction with the point of incidence 111 yields a bijective relationship for the directional information item 112. For the parameterized specification of the second point of incidence 201 with the second surface 200, it was found that the specification of a radius $r_n$ normalized to 1 is particularly advantageous because the directional information item 112 in that case merely includes an angle between 0 and 360 degrees and a radius in the range $0°<° \ r_n \leq° \ 1$, and a specification of the axial position of the second surface 200 is not required any more either. All that is required for the further calculation is a set of two parameters, for example angle and normalized radius, while the axial position may remain unconsidered. It was found to be advantageous to choose the position of an aperture stop for the second surface 200 because the most rays are frequently shaded there, especially if the lens is stopped down. Then, the maximum normalized radius $r_n°=° \ 1$ is chosen for the simulation of the lens with the open stop, while a corresponding smaller value for is chosen when simulating a stopped-down lens. The second data record 1020 may include these information items 1022 about the stopping down of the lens to be simulated. Since the actual axial position of the second surface 200 and the actual size of the aperture stop are unknown, or at least need not be known, on account of the parameterization while the effect of the aperture stop is reproduced by a suitable choice of the radius $r_n$, maximum confidentiality regarding the actual position of the aperture stop can be ensured.

In addition to the typical information about the radius of an approximately circular aperture, data describing a change in shape of the aperture stop may also be contained. By way of example, the iris diaphragm of a Carl Zeiss Sonnar 2.8/135 with C/Y-mount and a set f-number of 4 exhibits a pronounced deviation from rotational symmetry. The transmissive region of the stop or aperture stop is described by at least one dimension, for example a radius; however, other dimensions can also be used to describe more complex forms of the stop.

Furthermore, the second data record 1020 may include information items 1023 relating to one or more further imaging parameters that are adjustable on the lens and influence the imaging. According to an exemplary embodiment of the disclosure, this includes, by way of example but without this list being exhaustive, the focal length and/or the focal distance of the simulated lens and/or a parameter for variable adjustment of the field curvature. As an alternative to the focal length of the lens, the imaging scale may also be contained, in relation to the imaging scale of objects imaged in focus into the sensor plane. Furthermore, the second data record 1020 may include information about ray deflections by variable mirrors or other optical elements, such as a diffractive elements, polarizers, optical filters such as neutral density filters, frequency filters, variable beam splitters or Alvarez plates, or other movable free-formed surfaces.

Furthermore, the second data record 1020 may include information items 1024 relating to one or more wavelengths, wavelength ranges or colors of the light rays to be simulated.

Consequently, the second data record 1020 contains all variables chosen or effected by the user of the simulation, such as parameters that are adjustable on the simulated lens and information about light rays to be simulated 1021, 1024. By contrast, the first data record 1010 only contains the data which contain the imaging behavior of the lens for all conceivable combinations of the adjustable parameters 1022, 1023. It is self-evident that the full range of parameters 1022, 1023 that should be admitted is considered during the training or optimization phase for creating the first data record 1010. Usually, this range is specified by the possibilities of the real model of the lens to be simulated.

To perform the simulation according to an exemplary embodiment of the disclosure of a given lens, the first data record 1010 is required first before the actual simulation is carried out, said first data record, by application of the transformation rule 900, describing the imaging behavior of the lens to be simulated and the virtual front surface 1011 of the lens 1 to be simulated. The first data record 1010 can be obtained by calculation, as set forth below.

Initially, a second surface 200 is chosen between the position of the sensor and the position of the virtual front surface. The first data record 1010 is precalculated while taking account of the possible adjustable parameters 1022, 1023 and the second surface 200. To this end, the following steps are carried out for one or more wavelengths or wavelength ranges:

Ray tracing is carried out with the aid of the exact optical construction of the lens to be simulated for a plurality of rays and a plurality of settings of the adjustable parameter or parameters such as focal distance or focal length.

The first data record 1010 is calculated by way of an optimization algorithm. To this end, use can be made of known iterative optimization algorithms or fit algorithms from the prior art. A particularly suitable algorithm is known as the "orthogonal matching pursuit" algorithm. The result of this fitting or optimization process is the first data record 1010, which supplies position and direction of the output ray for a given input ray and given adjustable lens parameters while taking account of the second data record 1020.

In addition to this optimization process, one or more locations may be identified in the lens 1 to be simulated, rays being shaded and hence absorbed at said locations because they run into the housing of the lens or into a stop, for example. A shading surface 210 at a position where the simulated light ray 800 runs into the housing of the lens 1 is shown in FIG. 3. As an alternative, the aperture stop 3, the diameter, and/or the shape of which can be chosen, can also be represented by an additional shading surface. Many lenses contain such a stop. The information about all shading surfaces considered becomes part of the data record by virtue of a plurality of partial data records 1030 being formed. Each of these partial data records 1030 contains information about the coefficients which are suitable for the partial simulation of the lens to be simulated, from the sensor surface to the respective shading surface. The actual axial positions of these shading surfaces are not relevant. A ray position can be specified for each shading surface by way of a parameterized approach, the parameters for example including an azimuth angle and a radius or an elevation angle or, particularly typically, a normalized radius.

The data record 1010 must at least include information about the coefficients which are suitable for simulating the ray paths from the sensor surface to the virtual front surface 1011 or to the lens front surface or to the entrance pupil of the lens 1.

The virtual front surface 1011 may be defined in advance. However, it is also possible to also optimize the virtual front surface 1011 as a part of the optimization process for the data record 1010.

As an alternative to this method of optimized calculation, the first data record 1010 may also be obtained with the aid of measurements on at least one physical embodiment of the lens to be simulated. To the end, exemplary objects can be imaged using the lens and the arising images can be recorded. This may be carried out for a plurality of settings of the parameters that are adjustable on the lens, for example focus and/or focal length/magnification and/or opening of the aperture stop. The required set of coefficients which forms the first data record 1010 can then be established by back-calculation from the images obtained. A further option for obtaining the data record by a measurement is to shine a single light beam at a suitable wavelength, for example a laser beam, through a physical embodiment of the lens to be simulated. The effect of the lens on the beam can be detected at the other end of the lens by measurement. This can be carried out for further wavelengths and different points of incidence and directions of the light beam. The required set of coefficients which forms the first data record 1010 can then be established by back-calculation from the measurement values thus obtained.

It is self-evident that the values of the first data record 1010 obtained by calculation and/or measurement can still be subsequently altered empirically, for example to reproduce manufacturing tolerances or imperfections of physical embodiments of the lenses.

To carry out the simulation according to an exemplary embodiment of the disclosure of the imaging of a given lens 1, a computer program product is loaded onto a non-transitory computer readable storage medium of a computer 300, said computer program product putting the computer 300 into a position where it can carry out, by a processor, a calculation in accordance with the transformation rule 900. The previously pre-calculated first data record 1010, which contains information about the lens to be simulated and the virtual front surface 1011, is likewise loaded onto the computer 300.

A second data record 1020 is generated, said data record including information items 1021 about a ray 2010 to be simulated that is incident on the sensor and information items about one or more parameters 1022, 1023 that are adjustable on the lens. In addition to the color or wavelength, the information items 1021 about the ray 2020 to be simulated include a point of incidence 111 of the ray on the sensor 100 and a directional information item 112, which may also be provided from an information item about the second point of intersection 201 with a second surface 200 which may contain the aperture stop. The point of incidence 111 typically corresponds to the position of a simulated pixel of the simulated sensor 100. Typically, only those rays which are incident on the second surface 200 only within the region that is transmissive according to the information item 1022 about the set stop are considered. In the case of a circular aperture stop with a normalized radius $r_b$, this may be realized in such a way that only rays to be simulated with points of incidence with a radius $r°<°r_b$ are generated and traced. In the case of complicated geometries of the aperture stop 3 or the shading surface 210, it is possible to generate rays that strike the second surface 200 outside of the region that is transmissive according to the information item 1022 about the set stop, but these are discarded since only rays that come from the transmissive region of a stop can reach the sensor. The procedure described here for the aperture stop can be carried out analogously for all other shading surfaces 210 possibly present in the lens.

Then, to simulate an individual light ray 800 which contributes to the image representation to be simulated at a pixel to be chosen, the computing unit of the computer 300 carries out a calculation according to the transformation rule 900 with the input data records 1010, 1020, this yielding an output data record 2000 which contains which incident ray 2010 is converted by the simulated lens into the ray 2020 of the input data record 1021 that is incident on the sensor. If one or more shading surfaces, for example an aperture stop, are present in the lens to be simulated, the simulation can run in a plurality of partial steps, wherein a calculation is carried out in each case from the sensor surface 110 to one of the shading surfaces 210. A separate partial step is calculated for each of the shading surfaces 210, the sequence in which these partial steps are carried out being irrelevant. Typically, surfaces causing much shading are considered before those that bring about a little shading. The partial steps can also run in parallel. A test step follows in each case, regarding whether the ray is absorbed by or transmitted through the shading surface at a third point of intersection 211. Absorbed rays are discarded, transmitted rays are traced further. Ray tracing is also implemented from the sensor surface to the virtual front surface 1011 or the lens front surface or the entrance pupil. The output data record 2000 obtained in this way contains information items about the ray 2010 incident on the virtual front surface 1011 or the lens front surface or the entrance pupil. These include the first point of intersection 1013 of the ray 2010 with the virtual front surface 1011 and a directional information item, described for example by a three-dimensional vector or by a parameterized representation of the point of intersection by another surface, or by two angles in relation to a coordinate system linked to the simulated lens.

To calculate color images, the simulation step for simulating an individual light ray can optionally be carried out multiple times, typically three times, with a different wavelength or different wavelength band of the simulated light being assumed in each of these ray tracing calculations and a different partial data record 1010r, 1010g, and 1010b being able to be used for the simulation. For simulated lenses with small chromatic aberrations ray tracing for only one data record 1010 may be sufficient, with a differential correction of the result ray directions and/or result ray positions being carried out for at least one of the considered wavelengths. The simulations step including a plurality of individual ray simulations for different wavelengths or including a single ray simulation with a subsequent differential correction step for further colors shall be referred to below as polychromatic ray simulation step.

On the basis of the output data record for a given ray 2020, the intensity of the incident light 2010 can be deduced on the basis of the model of the scene to be imaged, from which the intensity contribution or, equivalently, the brightness contribution of this simulated light ray to the signal of the considered pixel in the respectively considered wavelength or color arises.

For the same target pixel, the described monochromatic or polychromatic ray simulation step is carried out for a plurality of rays to be simulated. These are chosen such that they emanate from different positions on the second surface 200, typically the aperture stop 3.

A brightness contribution, the intensity of the incident light ray 2010 at a given wavelength, is determined from information about the light coming from the object feature of the modeled scene observed in this direction for each of these simulated rays and all brightness contributions for a picture element are added up. The brightness contributions of shaded rays are discarded or set to zero so that they do not contribute. The intensities or brightness levels of the picture elements thus obtained are stored in a computer memory, typically in a random-access memory, the RAM, or in a flash memory or on a magnetic disk.

The described simulation steps are repeated for further pixels of the sensor until a first image is completely constructed.

To generate an image sequence for a cinematographic image sequence, the described steps are repeated for further images. In this case, the scene to be modeled, the position of the camera to be simulated and/or the adjustable lens parameters such as for example focus and/or focal length and/or aperture stop may change. Such changes are required for cinematographic effects in particular, where for example the attention of the observer is steered from one object feature to another by a focal shift. As described, there is no recalculation of the first data record 1010 in the case of such changes. Changes in adjustable lens parameters are only incorporated in the second data record 1020, which brings a substantial speed advantage over methods from the prior art and makes the rendering of such scenes by way of the method according to an exemplary embodiment of the disclosure particularly efficient.

As described, this may still be followed by a compositing method step, in which the simulated image or the simulated image sequence is fused with actually recorded images.

Figure 7:
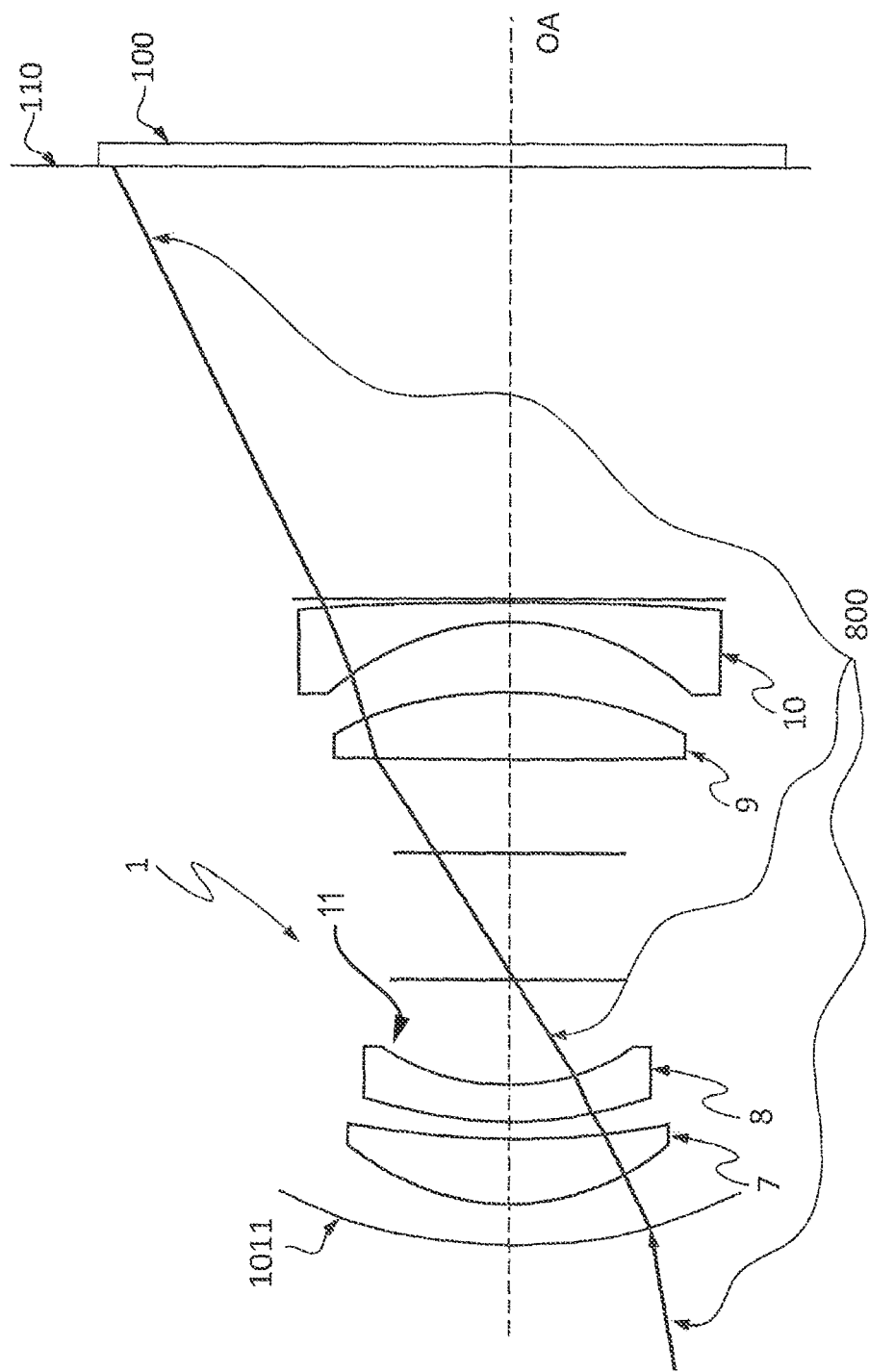
FIG. 7 schematically shows the optical structure of an exemplary lens to be simulated.

FIG. 7 illustrates a schematic lens-element section of an exemplary lens to be simulated, for an "infinity" focus setting. As may be gathered from the illustration in FIG. 7, the lens 1 includes a first, a second, a third, and a fourth lens element 7, 8, 9, and 10, which are successively arranged in this sequence along an optical axis OA of the lens 1 proceeding from the object side. The first and the third lens elements 7, 9 each have positive refractive power and the second and the fourth lens elements 8, 10 each have negative refractive power.

The method according to an exemplary embodiment of the disclosure for simulating the effect of the lens of FIG. 7 may consequently include the following steps:

A virtual front surface 1011 is defined first. The virtual front surface 1011 is located at a predefined distance in front of the image sensor 100 and has a predefined and/or optimized radius of curvature. In the exemplary embodiment, the distance from the sensor is 60.0° mm and the radius of curvature is 13.365° mm; however, other values may also be chosen, depending on application and/or need. In the second step, the lens model is created by a training phase. To this end, a plurality of training or validation rays are generated, each with a defined wavelength. By way of example, these may be more than 5000 training rays, but typically more than 10° 000 training rays, and/or more than 2000 validation rays, but typically more than 4000 validation rays, per wavelength and/or focus and/or considered value of one or more other variable lens parameters. The focus settings were generated in the exemplary embodiment. The exemplary embodiment assumed 9 approximately equally distributed focus settings and a 440° nm wavelength of the simulated light.

The shading surfaces are identified in the next step. In the exemplary embodiment, these are the radius of the front surface of the first lens element 7 of 8.7° mm and a further shading surface 11 with a radius of 6.0° mm.

In the next step, the parameter set for the abstract mathematical model given by the transformation rule is created with an optimization method. In the exemplary embodiment, this is a sparse polynomial with 20 coefficients of no more than 6th order for the ray position and direction, and with 5 coefficients of no more than 3rd order for the shading information.

This exemplary model is optimized using the orthogonal matching pursuit method and the specified coefficients are calculated in the process.

The resulting output data include at least one of the values from the following data: radius of curvature of the virtual front surface, distance between the virtual front surface and sensor, minimum f-number ($F_{min}$), supported focal range (d), and focal length (f).

The user of the exemplary lens model obtains the following metadata:

Radius of curvature of the virtual front surface: 13.365° mm

Distance between the virtual front surface and the sensor: 60.0° mm

Minimum f-number: $F_{min}$=2.87

Supported focal range: d=507° mm to infinity

Focal length: f=50.0° mm

Input variables of the exemplary lens model:

$x_s$, $y_s$: Ray position of the sensor, definition ranges 18.0° mm≤$x_s$≤18.0° mm and −12° mm≤$y_s$≤12° mm $x_a$, $y_a$: Ray position in the virtual stop, definition range: $x_a^2 + y_a^2 < (F_{min}/F)^2$ for the f-number F $\beta 3 = f/(f-d)$ Output variables of the exemplary lens model:

$x_f$, $y_f$: Ray position projected onto a tangential plane at the apex of the virtual front surface in mm $u_f$, $v_f$: Ray position projected onto a tangential plane of the virtual front surfaces at the ray point $x_{v1}$, $y_{v1}$, $x_{v2}$, $y_{v2}$: Ray position on shaded surfaces. The ray is shaded if $x^2+y^2>1$ at one of the shading surfaces that generate vignetting.

Added to this are the fit data of the parameterized optics of the lens to be simulated in the exemplary embodiment:

$x_f$

| Coefficient | Exponent $x_s$ | Exponent $y_s$ | Exponent $x_a$ | Exponent $y_a$ | Exponent $\beta$ | Order |
|---|---|---|---|---|---|---|
| −0.459663284 | 1 | 0 | 0 | 0 | 0 | 1 |
| 8.768720761 | 0 | 0 | 1 | 0 | 0 | 1 |
| −1.304539732 | 1 | 0 | 0 | 0 | 1 | 2 |
| 0.000110631 | 3 | 0 | 0 | 0 | 0 | 3 |
| −0.00496582 | 2 | 0 | 1 | 0 | 0 | 3 |
| 0.000109726 | 1 | 2 | 0 | 0 | 0 | 3 |
| −0.005078146 | 1 | 1 | 0 | 1 | 0 | 3 |
| 0.091802222 | 1 | 0 | 2 | 0 | 0 | 3 |
| 0.067526222 | 1 | 0 | 0 | 2 | 0 | 3 |
| 0.025031505 | 0 | 1 | 1 | 1 | 0 | 3 |
| −0.07933075 | 0 | 0 | 1 | 2 | 0 | 3 |
| 0.000671128 | 3 | 0 | 0 | 0 | 1 | 4 |
| 0.000725495 | 1 | 2 | 0 | 0 | 1 | 4 |
| 1.134481527 | 0 | 0 | 3 | 0 | 1 | 4 |
| −5.36E−05 | 2 | 1 | 1 | 1 | 0 | 5 |
| 0.137138593 | 2 | 0 | 1 | 0 | 2 | 5 |
| 0.158010585 | 1 | 1 | 0 | 1 | 2 | 5 |
| −0.784407072 | 1 | 0 | 0 | 2 | 2 | 5 |
| 3.288014989 | 1 | 0 | 0 | 0 | 4 | 5 |
| 0.000741927 | 3 | 0 | 2 | 0 | 1 | 6 |

$u_f$

| Coefficient | Exponent $x_s$ | Exponent $y_s$ | Exponent $x_a$ | Exponent $y_a$ | Exponent $\beta$ | Order |
|---|---|---|---|---|---|---|
| 0.014551901 | 1 | 0 | 0 | 0 | 0 | 1 |
| −0.666745323 | 0 | 0 | 1 | 0 | 0 | 1 |
| 0.06893195 | 1 | 0 | 0 | 0 | 1 | 2 |
| 0.000145798 | 2 | 0 | 1 | 0 | 0 | 3 |
| 7.79E−06 | 1 | 2 | 0 | 0 | 0 | 3 |
| −0.000358482 | 1 | 1 | 0 | 1 | 0 | 3 |
| −0.00282992 | 1 | 0 | 2 | 0 | 0 | 3 |
| 0.002553763 | 1 | 0 | 0 | 2 | 0 | 3 |
| −0.000240285 | 0 | 2 | 1 | 0 | 0 | 3 |
| 0.013381898 | 0 | 1 | 1 | 1 | 0 | 3 |
| 0.021614836 | 0 | 0 | 3 | 0 | 0 | 3 |
| −0.159397768 | 0 | 0 | 1 | 2 | 0 | 3 |
| −1.127168311 | 0 | 0 | 1 | 0 | 2 | 3 |
| 4.83E−05 | 1 | 2 | 0 | 0 | 1 | 4 |
| −0.002460254 | 1 | 1 | 0 | 1 | 1 | 4 |
| −0.00172234 | 0 | 2 | 1 | 0 | 1 | 4 |
| −7.99E−06 | 1 | 2 | 2 | 0 | 0 | 5 |
| 0.000348182 | 1 | 1 | 2 | 1 | 0 | 5 |
| −0.176833532 | 1 | 0 | 0 | 2 | 2 | 5 |
| −0.47254192 | 0 | 1 | 1 | 1 | 2 | 5 |

$x_{v1}$

| Coefficient | Exponent $x_s$ | Exponent $y_s$ | Exponent $x_a$ | Exponent $y_a$ | Exponent $\beta$ | Order |
|---|---|---|---|---|---|---|
| −0.027987126 | 1 | 0 | 0 | 0 | 0 | 1 |
| 1.011147804 | 0 | 0 | 1 | 0 | 0 | 1 |
| −0.000368083 | 2 | 0 | 1 | 0 | 0 | 3 |
| −0.000342116 | 1 | 1 | 0 | 1 | 0 | 3 |
| 0.005565995 | 1 | 0 | 0 | 2 | 0 | 3 |

$x_{v2}$

| Coefficient | Exponent $x_s$ | Exponent $y_s$ | Exponent $x_a$ | Exponent $y_a$ | Exponent $\beta$ | Order |
|---|---|---|---|---|---|---|
| 0.031357313 | 1 | 0 | 0 | 0 | 0 | 1 |
| 0.926341281 | 0 | 0 | 1 | 0 | 0 | 1 |
| 0.043996073 | 1 | 0 | 0 | 0 | 1 | 2 |
| −0.257282737 | 0 | 0 | 1 | 0 | 1 | 2 |
| 3.06E−06 | 3 | 0 | 0 | 0 | 0 | 3 |

The coefficients for $y_f$, $y_f$, $y_{v1}$ have not been illustrated as they emerge directly from those for $x_f$, $u_f$, $x_{v1}$ and $x_{v2}$, respectively, for reasons of symmetry. Here, $$x_f = \sum_{i,j,k,l,m} c_{ijklm} x_s^i y_s^j x_a^k y_a^l \beta^m$$

with the coefficient c, the exponent i of $x_s$, the exponent j of $y_s$, the exponent of k of $x_a$, the exponent l of $y_a$, and the exponent m of $\beta$. This likewise applies to $u_f$ in the second table. One could also write:

$x_f$

| $c_{ijklm}$ | i | j | k | l | m | Order |
|---|---|---|---|---|---|---|
| −0.459663284 | 1 | 0 | 0 | 0 | 0 | 1 |
| 8.768720761 | 0 | 0 | 1 | 0 | 0 | 1 |
| −1.304539732 | 1 | 0 | 0 | 0 | 1 | 2 |

It is understood that information about the scene to be imaged is required to calculate the intensity or brightness and the color of a pixel. If the directional information item about the first point of intersection 1013 of the light ray to be simulated which is incident on the virtual front surface 1011 is available, it is possible to carry out a back calculation as to the point on the modeled object from which the light incident there emanates. The information about the direction and the point of incidence or the first point of intersection 1013 of the simulated light ray can be implemented, for example, by the simulation method according to the disclosure, but also by other methods that supply equivalent results. Conventional ray tracing would be one example. Instead of the first point of intersection 1013 with the virtual front surface 1011, it is also possible to use a point of incidence on the first optically effective surface of the simulated lens or point of incidence in the entrance pupil of the simulated lens or a point of incidence on a surface located far in front of the lens and/or close to the scene to be modeled.

One option for determining the object point from which a light ray 2010 incident in the lens emanates lies in conventional ray tracing. An advantage thereof is that the representations thus obtained are physically correct and hence photorealistic. A disadvantage is that such calculations are very complicated and therefore require much computation time. It is desirable to have a method available which makes information available regarding the color and intensity or brightness applied to a light ray emanating from a modeled object and incident on the simulated lens 1 or a virtual front surface 1011 in front of the lens significantly faster than when using ray tracing.

It is therefore also an object of the disclosure to provide a method which makes available physically almost correct information regarding the color and intensity or brightness applied to a light ray emanating from a modeled object and incident on the simulated lens or a virtual front surface in front of the lens significantly faster than when using ray tracing.

This object according to an exemplary embodiment of the disclosure is achieved, in conjunction with the described method for simulating lenses.

In this context, it is desirable for this method according to an exemplary embodiment of the disclosure to be able to profit from the particular properties of the GPUs in relation to speed and parallelization.

Knowledge of the ray directions, intensities and colors of the light rays 800 incident on an entrance surface 3000 is equivalent to the knowledge of what is known as the light field at this entrance surface. The nature of the entrance surface 3000 is such that it may contain for example the entrance pupil, the front surface of the front lens element or the virtual front surface 1011. In principle, any other surface may also be chosen provided the rays 800 contributing to the creation of the image pass through this surface. It is advantageous if the entrance surface 3000 is chosen to be larger than for example the entrance pupil, the front surface of the front lens element or the virtual front surface 1011. Should a simulation of the image creation by a lens be carried out using the simulation method described according to an exemplary embodiment of the disclosure, it is particularly advantageous to choose the entrance surface 3000 such that it includes the entrance pupil of the lens to be simulated or the front surface of the lens 1 to be simulated or the virtual front surface 1011, because in this case the light field approximated in the entrance surface 3000 can be used without a further transformation step for the simulation of the image creation.

If the light field is known, the image creation by the lens 1 to be simulated can be modeled correctly with the aid of thereof. Knowledge of the light field or of the parts of the light field relevant to the image representation can be obtained by ray tracing. However, this is very computationally intensive and therefore slow. However, full knowledge of the light field is not necessarily required to calculate realistic image, a sufficiently good approximation sufficing instead.

A method according to an exemplary embodiment of the disclosure for obtaining such a sufficiently good approximation is the method described below.

A plurality of ideal images are generated at different positions of the entrance surface 3000. This can be implemented by calculating these images with a pinhole camera model for pinhole cameras attached to the respective positions. The respective creation of a depth map for the scene to be modeled in addition to the ideal images is also useful. Advantageously, the pinhole camera images can be arranged such that they are each located at the position at which an incident simulated light ray strikes the entrance surface 3000. In this case, from the knowledge of the direction of this beam, the information about the intensity and color of the light ray can be gathered directly from the pinhole camera image. Firstly, this can be achieved by virtue of pinhole camera images being generated at the respective positions and ray tracing subsequently being carried out through the lens, from the position of the pinhole camera to a certain pixel, or ray tracing is initially carried out to a certain position on the entrance surface 3000 and the corresponding pinhole camera image is generated subsequently.

To increase the number of available pinhole camera images, new pinhole camera images can be calculated by interpolation or extrapolation from existing pinhole camera images and at least one associated depth map. Here, the use of at least one depth map is necessary to generate the interpolated pinhole camera images with correct perspective. These interpolated images can be generated, for example using a method known as "screen space ray tracing."

Figure 8:
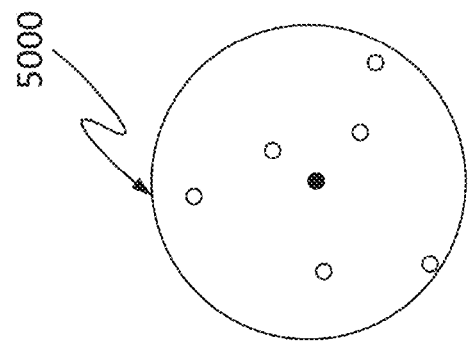
FIG. 8 schematically shows the positioning of pinhole camera images relative to the entrance pupil.
Figure 8:
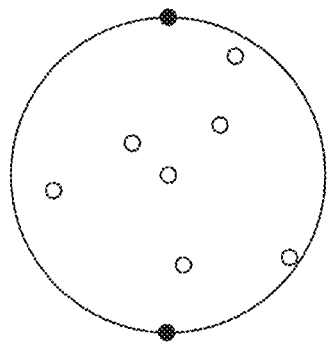
Figure 8:
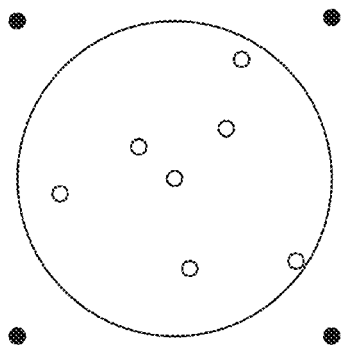

In principle, it is possible to carry out such interpolations already from a single pinhole camera image with an associated depth map. However, at least two, particularly typically three or more pinhole camera images are typical. FIG. 8 shows the situation in exemplary fashion for four, two and one rendered pinhole camera image 5100 and the interpolated or extrapolated pinhole camera images 5200, arising therefrom, in relation to the entrance pupil 5000.

New pinhole camera images can also be obtained by artificial intelligence (AI) methods, with or without a depth map available, for example with the aid of a neural network.

Figure 9:
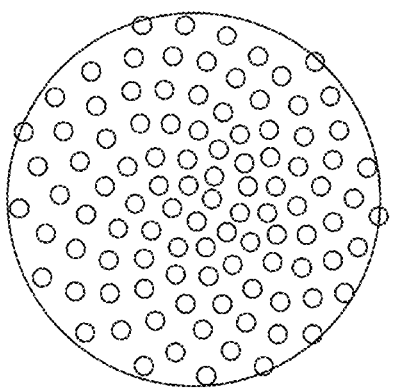
FIG. 9 schematically shows an arrangement of pinhole camera images relative to the entrance pupil, in the form of a Fibonacci spiral.

The positions of the pinhole cameras can particularly advantageously be arranged in one of the following setups:

A fixed spiral grid of constant density, for example in the form of a so-called Fibonacci spiral as shown in FIG. 9. The positions of such pinhole cameras are typically arranged within the transmissive region of the entrance surface 3000.

Figure 10:
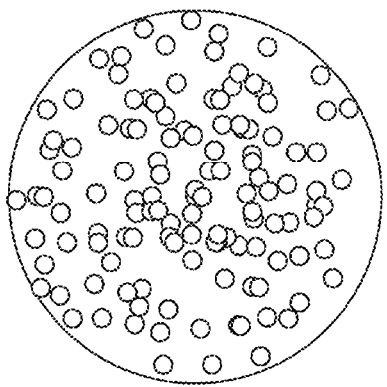
FIG. 10 schematically shows a random arrangement of pinhole camera images relative to the entrance pupil.

A purely random arrangement, as shown in FIG. 10.

At least three pinhole cameras at positions outside of the transmissive region of the entrance surface 3000 such that the entrance pupil or the front surface or the virtual front surface 1011 is located within the polygon described by the positions of the pinhole cameras.

The positions of the pinhole camera images to be used can be fitted to the scene to be modeled in order to have available a sufficient number of perspective views and in order to avoid artifacts. By way of example, a gaze through a thin pipe may require perspectives that look into the pipe and other perspectives that look at the pipe from the outside.

Naturally, any other arrangements of the pinhole cameras are also comprised by the disclosure. Fixed positions with an approximately constant density improve the parallelizability of the method, in particular on GPU-assisted calculation systems, and reduce noise in the resultant image. The quality of the result image increases with the number of ideal images used. This applies in particular to regions with significant blur since the images of defocused object points, which form the bokeh, are particularly complex. It was found to be advantageous to heuristically adapt the density of the positions by virtue of using information from the depth map and comparing this to the focus setting, to be simulated, of the lens to be simulated. The position of the pinhole camera grid can also be rotated or disturbed randomly, which may lead to a higher image quality. It is also advantageous to statically or dynamically adapt the density of the pinhole cameras to a heuristic quality measure of the resultant picture element.

The information about the light field is obtained by an interpolation of the information from the individual ideal images. This may be carried out individually for each wavelength required, or else only exactly for a single wavelength while the information for the other required wavelengths is approximated therefrom in differential fashion.

The simulation of the generation of the image is implemented by simulating the contributions of all picture elements or pixels of the sensor 100 to be simulated. To this end, the light contributions of a pixel are integrated, by virtue of initially determining the direction of incidence of these rays on the entrance surface 3000 for a plurality of rays incident on this pixel. Rays that are shaded in the object 1 are discarded. The plurality of rays can typically be chosen such that the entrance surface 3000 is sufficiently uniformly penetrated by the rays. Another typical plurality of the rays can be chosen such that they intersect the entrance surface 3000 precisely at the positions for which ideal images are present. When converting interpolated ideal images into ray color and intensity, the inclusion of weighting factors may be advantageous since each image pixel corresponds to a light cone of a different size. By way of example, pixels right at the edge of the image recorder cover a smaller angular range than those in the center.

This simulation is typically carried out using the described parameterized method according to an exemplary embodiment of the disclosure, but other simulations such as ray tracing can also be used.

For each simulated ray, the brightness contribution of this ray at the corresponding pixel is deduced from knowledge of ray direction, position on the entrance surface 3000 and knowledge of the light field or the approximate light field. This is implemented by evaluating the respectively associated pinhole camera image. The brightness contributions of all simulated rays are summed at the respectively corresponding pixels, as a result of which the image of the scene to be modeled arises.

The beam direction for a given point of incidence on the imaging system and on the entrance surface 3000 depends on the wavelength. To determine the brightness contribution of a light ray from a light field or from an approximated light field it is possible to carry out a separate calculation for each required wavelength or color. If the directional changes are only small, it may be sufficient to assume only one calculation rule for a main wavelength and to only make small changes to this calculation rule for other wavelengths. The relative position in the light field is first determined for a main wavelength W1 and the brightness contribution or intensity contribution is determined therefrom. Then, for the same points of incidence of the simulated light ray at the imaging system and at the entrance surface 3000, the utilized relative position at W1 is used as a starting point for searching for the correct relative position for the further wavelengths. Then, the brightness contribution or the brightness contributions can be calculated for one or more wavelengths. By way of example, this can be implemented by interpolation, typically linear interpolation for the selected wavelengths. By applying this procedure to a plurality of picture elements of the imaging system it is possible to obtain an image of the scene to be modeled, including polychromatic aberrations of the lens.

The accuracy with which the beam direction is determined by the parametric optics is decisive for the quality of the resultant simulated image. This emerges from the laws of geometric optics, in particular from the intercept theorem. The directional differences of the ray for different wavelengths or colors in the case of the same points of incidence on the imaging system and on the entrance surface 3000 are linear in a first approximation. Depending on the chosen parametric representation, these differences can be fitted using a reduced set of parameters with an unchanged overall accuracy, as a result of which less computation time is required during the evaluation of the parametric function.

Figure 11:
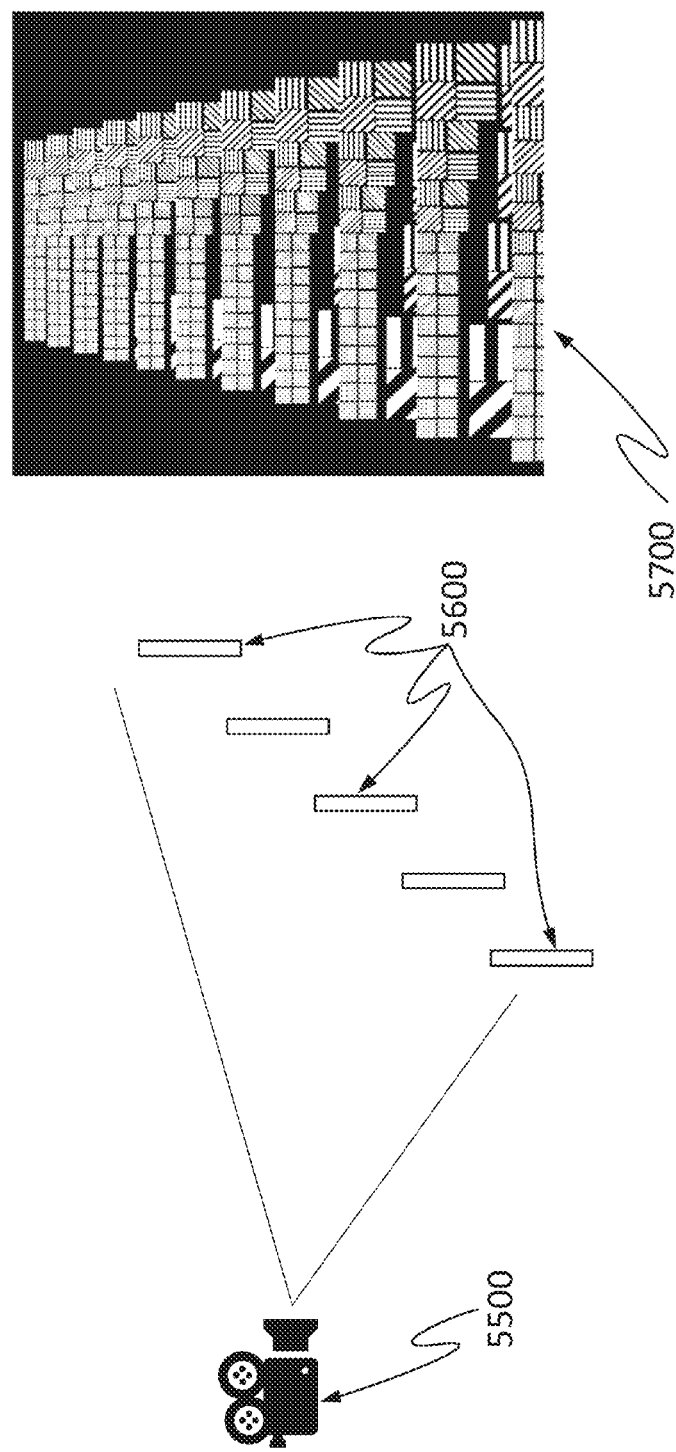
FIG. 11 schematically shows the exemplary construction of an image simulation on the basis of an abstract stairway object and an associated pinhole camera image of this stairway object.
Figure 12:
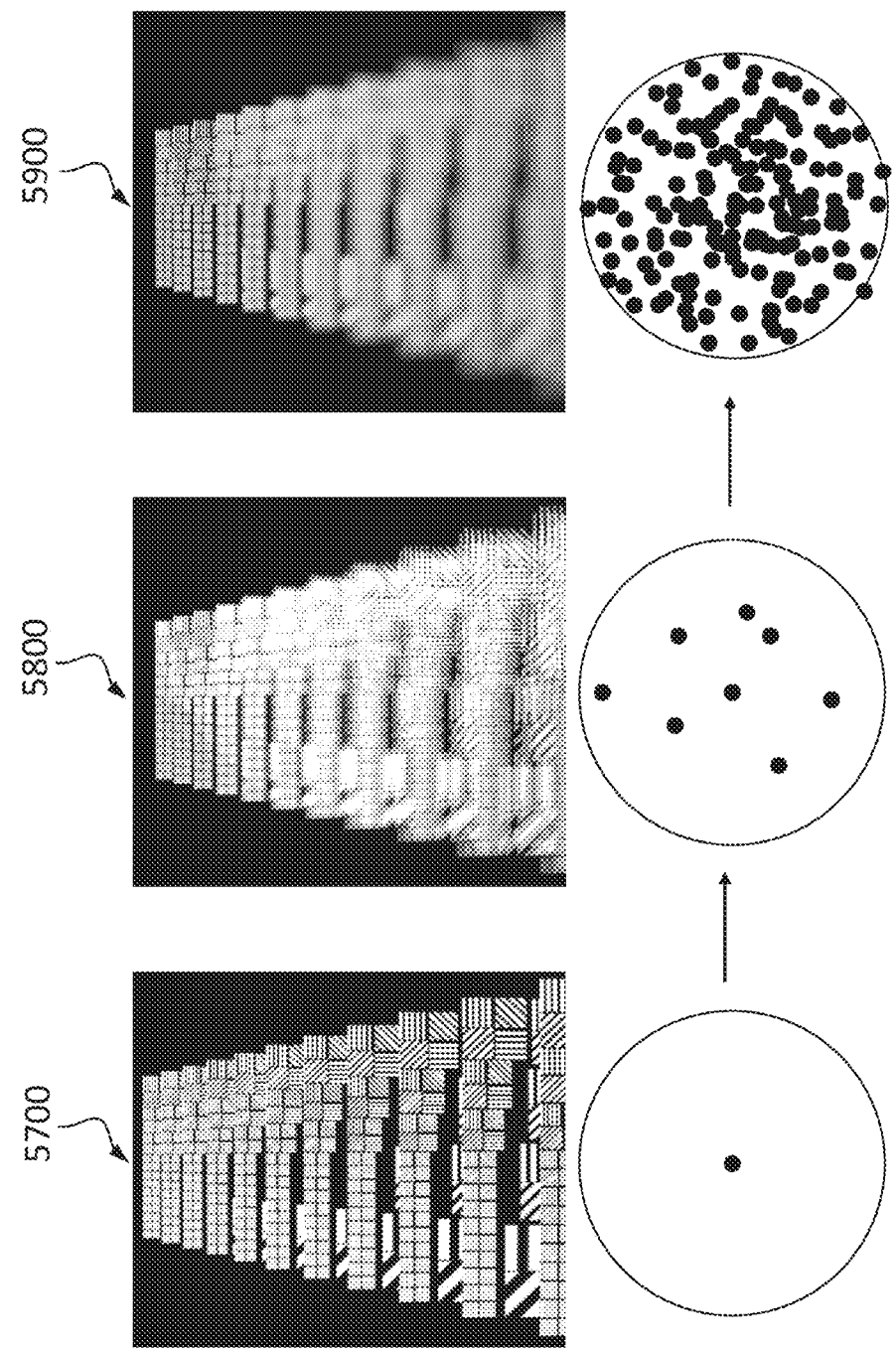
FIG. 12 schematically shows images of an abstract stairway object simulated according to an exemplary embodiment of the disclosure with one, a few and many pinhole camera images used to this end, and the positioning of the pinhole cameras relative to the entrance pupil.

FIG. 11 schematically shows in exemplary fashion the construction of an image simulation on the basis of an abstract stairway object and an associated pinhole camera image of this stairway object. Recording a set of objects 5600 arranged in stairway-type fashion is simulated, said objects being recorded by a camera 5500 such that the individual steps have different distances from the camera 5500. One of the steps is in the focus of the camera while the other steps are outside of the focus. An image of the stairway object 5700 recorded with an arbitrarily small aperture stop corresponds to a pinhole camera image with infinite depth of field. The individual steps are all imaged with the same sharpness in this case. FIG. 12 shows a comparison of three images 5700, 5800, and 5900 of the stairway object made with three simulations using the method according to an exemplary embodiment of the disclosure, image 5700 being simulated with one pinhole camera, image 5800 being simulated with a few pinhole cameras, and image 5900 being simulated with a plurality of pinhole cameras.

The image that arose from the simulation may be mixed by compositing with actually recorded images. According to an exemplar embodiment of the disclosure, the simulated image is generated by a lens simulation which simulates the lens used in a real recording, as a result of which the arising image impression of the mixed image is particularly harmonious.

Overview of the Solutions According to an Exemplary Embodiment of the Disclosure A) A method for generating a brightness contribution for a picture element of an image by simulating an image representation of a scene using an optical imaging system which comprises an image recorder (100) located on a first surface (110) and a lens (1), comprising the following steps:
  providing a first data record (1010) comprising data which describe the effect on light rays (800) of the lens (1) to be simulated,
  providing a second data record (1020) comprising data about a point of incidence (111) of a light ray (800) on the image recorder (100) and about a virtual front surface (1011),
  providing a transformation rule (900),
  calculating a first point of intersection (1013) of the light ray (800) with the virtual front surface (1011) and a direction of the light ray (800) at the first point of intersection (1013) by way of applying the transformation rule (900) to the first data record (1010) and the second data record (1020),
  determining the brightness contribution of the light ray (800),
  storing an information item regarding the calculated brightness contribution of the light ray (800), wherein the first data record (1010) comprises data about a second surface (200) and the second data record comprises data about a second point of intersection (201) of the light ray (800) with the second surface (200).

B) The method according to A), wherein
  the lens (1) has at least one adjustable imaging parameter (1022, 1023) and
  the second data record (1020) contains information items about the at least one adjustable imaging parameter (1022, 1023) of the lens (1).

C) The method according to B), wherein the adjustable imaging parameter (1023) comprises the focus setting and/or the focal length and/or the magnification and/or the field curvature of the lens (1).

D) The method according to A), B) or C), wherein the lens (1) comprises a stop, typically an aperture stop (3), and the second surface (200) coincides with the stop, typically with the aperture stop (3).

E) The method according to D), wherein one of the adjustable imaging parameters (1022) describes at least one of the dimensions of the aperture stop (3).

F) The method according to E), wherein the aperture stop (3) is at least approximately circular and the information items relating to the second point of intersection (201) of the light ray (800) with the second surface (200) contain a normalized radius.

G) The method according to any one of A) to F), wherein the first data record (1010) comprises data
  in relation to at least one shading area (210) in the lens (1) and
  in relation to the effect of a part of the lens (1) on the at least one light ray (800),
  which extends between the at least one shading surface (210) and the image recorder (100),
  and comprises the following steps before storing the brightness component of the at least one light ray (800):
    calculating a third point of intersection (211) with the at least one shading area (210),
    checking whether the at least one light ray (800) is absorbed by or transmitted through the third point of intersection (211),
    discarding the light ray (800) or setting the brightness component to zero if the at least one light ray (800) is absorbed.

H) A method for generating a picture element of an image, comprising the following steps:
  selecting a point of incidence (111) for light rays (800) on the image recorder (100),
  selecting a plurality of different second points of intersection (201) on the second surface (200),
  carrying out ray tracing according to A) to G) for each of the second points of intersection (201),
  summing the brightness contributions arising, and
  storing a result of the summation.

J) A method for generating an image, characterized by the following steps:
  selecting a plurality of picture elements on the image recorder,
  calculating the brightness contribution of the light ray (800) incident on each of the picture elements using the method according to H), and
  storing the results.

K) The method according to J), wherein
  the brightness contribution of each of the light rays (800) simulated to this end, which intersect the virtual front surface (1011) at the first point of intersection (1013), is determined with the aid of a pinhole camera image in each case,
  the nature of the image being such that it corresponds to the image generated by a pinhole camera placed at the respective first point of intersection (1013).

L) The method according to K), wherein the virtual front surface (1011) and the entrance pupil of the lens to be simulated coincide.

M) The method according to L), wherein the second surface (200) coincides with the virtual front surface.

P) The method according to any one of K), L) or M), wherein at least one of the pinhole camera images was calculated by interpolation or extrapolation from other pinhole camera images.

Q) A method for generating an image, comprising the following steps:
  providing a real image recorded by a real camera,
  providing a virtual image generated according to any one of K), L), M) or P),
  fusing or overlaying at least a portion of the real image and at least a portion of the virtual image,
  storing the image created, wherein the adjustable lens parameters used for the simulation correspond at least approximately to those used during the real recording.

R) A method for generating an image sequence consisting of individual images, comprising the following steps:
  providing a virtual scene,
  providing a camera position in relation to the virtual scene,
  calculating the individual images of the image sequence in accordance with one of the methods according to any one of K), L), M), P) or Q),
  storing the image sequence.

S) A computer program product suitable for carrying out a method according to any one of A) to R) after being loaded onto a computer.

It is understood that the foregoing description is that of the exemplary embodiments of the disclosure and that various changes and modifications may be made thereto without departing from the spirit and scope of the disclosure as defined in the appended claims.

1 Lens
2 Lens elements
3 Aperture stop
4 Mount
5 Pixel
11 Shading surface
100 Image recorder/sensor
110 Sensor surface
111 Point of incidence of the simulated light rays on the sensor
112 Directional information item regarding the ray incident on the sensor
200 Second surface
201 Second point of intersection
210 Shading surface
211 Third point of intersection
300 Computer
800 Simulated light ray
900 Transformation rule
901 Virtual lens
1000 Input data records
1010 First data record ("virtual lens")
1010r, 1010g, 1010b Partial data records for different colors
1011 Virtual front surface
1012 Axis of symmetry
1013 First point of intersection
1020 Second data record
1021 Information items regarding a light ray to be simulated
1022 Information items regarding the set stop
1023 Information items regarding further imaging parameters that are adjustable on the lens
1024 Information items regarding the wavelength or color of the light to be simulated
1030 Partial data records
2000 Output data record
2010 Incident ray
3000 Entrance surface
5000 Entrance pupil
5600 Stairway object
5700 Image of the stairway object simulated with one pinhole camera
5800 Image of the stairway object simulated with many pinhole cameras
5900 Image of the stairway object simulated with a plurality of pinhole cameras

What is claimed is:

1. A method for generating a brightness contribution for a picture element of an image by simulating an image representation of a scene using an optical imaging system which comprises an image recorder located on a first surface and a lens, the method comprising:
providing a first data record comprising data which describe an effect on light rays of the lens to be simulated;
providing a second data record comprising data about a point of incidence of a light ray on the image recorder and about a virtual front surface;
providing a transformation rule;
calculating a first point of intersection of the light ray with the virtual front surface and a direction of the light ray at the first point of intersection by applying the transformation rule to the first data record and the second data record;
determining the brightness contribution of the light ray; and
storing an information item regarding the brightness contribution of the light ray,
wherein:
the first data record comprises data about a second surface, and
the second data record comprises data about a second point of intersection of the light ray with the second surface.

2. The method as claimed in claim 1, wherein:
the lens has at least one adjustable imaging parameter, and
the second data record contains information items about the at least one adjustable imaging parameter of the lens.

3. The method as claimed in claim 2, wherein the at least one adjustable imaging parameter comprises at least one of a focus setting, a focal length, a magnification, and a field curvature of the lens.

4. The method as claimed in claim 2, wherein the lens comprises a stop, and the second surface coincides with the stop.

5. The method of claim 4, wherein:
the stop is an aperture stop, and
the second surface coincides with the aperture stop.

6. The method as claimed in claim 5, wherein one of the at least one adjustable imaging parameter describes at least one dimension of the aperture stop.

7. The method as claimed in claim 5, wherein the aperture stop is at least approximately circular and information items relating to the second point of intersection of the light rays with the second surface contain a normalized radius.

8. The method as claimed in claim 1, wherein the first data record comprises data
in relation to at least one shading area in the lens and in relation to an effect of a part of the lens on at least one light ray, which extends between the at least one shading area and the image recorder, and
wherein the method, before storing a brightness component of the at least one light ray, further comprises:
calculating a third point of intersection with the at least one shading area;
checking whether the at least one light ray is absorbed by or transmitted through the third point of intersection; and
discarding the at least one light ray or setting the brightness component to zero if the at least one light ray is absorbed.

9. A method for generating a picture element of an image, the method comprising:
selecting a point of incidence for light rays on an image recorder;
selecting a plurality of different second points of intersection on a second surface;
carrying out ray tracing for each of the different second points of intersection, wherein carrying out the ray tracing includes:
providing a first data record comprising data which describe an effect on light rays of a lens to be simulated, wherein the first data record comprises data about the second surface;
providing a second data record comprising data about a point of incidence of a light ray on the image recorder and about a virtual front surface, wherein the second data record comprises data about a second point of intersection of the light ray with the second surface;
providing a transformation rule; and calculating a first point of intersection of the light ray with the virtual front surface and a direction of the light ray at the first point of intersection by applying the transformation rule to the first data record and the second data record;

summing brightness contributions arising; and storing a result of a summation.

10. A method for generating an image, the method comprising:

selecting a plurality of picture elements on the image recorder;

calculating a brightness contribution of a light ray incident on each of the plurality of picture elements as claimed in claim 9; and storing results.

11. The method as claimed in claim 10, further comprising:

determining the brightness contribution of each of the light rays simulated, which intersect a virtual front surface at a first point of intersection, with a pinhole camera image in each case, a nature of the image being such that the image corresponds to the image generated by a pinhole camera placed at a respective first point of intersection.

12. The method as claimed in claim 11, wherein the virtual front surface and an entrance pupil of a lens to be simulated coincide.

13. The method as claimed in claim 12, wherein the second surface coincides with the virtual front surface.

14. The method as claimed in claim 11, wherein at least one of a plurality of pinhole camera images is calculated by interpolation or extrapolation from other pinhole camera images.

15. A method for generating an image, the method comprising:

providing a real image recorded by a real camera;

providing the image as claimed in claim 11;

fusing or overlaying at least a portion of the real image and at least a portion of a virtual image; and storing the image created, wherein at least one adjustable lens parameter provided for a simulation correspond at least approximately to adjustable lens parameters used during a real recording.

16. A method for generating an image sequence including individual images, the method comprising:

providing a virtual scene;

providing a camera position in relation to the virtual scene;

calculating the individual images of the image sequence determined in accordance with the method as claimed in claim 11; and storing the image sequence.

17. A computer readable non-transitory storage media encoded with software comprising computer executable instructions that when executed by a processor cause the processor to:

calculate a first point of intersection of a light ray with a virtual front surface and a direction of the light ray at the first point of intersection by applying a transformation rule to a first data record and a second data record;

determine a brightness contribution of the light ray; and store an information item regarding the calculated brightness contribution of the light ray, wherein:

the first data record comprises data about a second surface, and the second data record comprises data about a second point of intersection of the light ray with the second surface.

* * * * *